Dec. 10, 1968   J. S. ELBOGEN   3,415,273
VENT VALVE
Filed Oct. 29, 1965

INVENTOR
JAMES S. ELBOGEN

BY Oberlin, Maky & Donnelly
ATTORNEYS

United States Patent Office 3,415,273
Patented Dec. 10, 1968

3,415,273
VENT VALVE
James S. Elbogen, Northridge, Calif., assignor to Parker-Hannifin Corporation, Cleveland, Ohio, a corporation of Ohio
Filed Oct. 29, 1965, Ser. No. 505,706
4 Claims. (Cl. 137—522)

ABSTRACT OF THE DISCLOSURE

A vent valve for a fuel tank and the like including a spring biased valve member exposed to tank pressure for opening movement thereby when the tank pressure reaches a predetermined level, and a piston connected to the valve member which defines a chamber with the valve body, such piston being adapted to open the valve member independently of the fluid pressure in the tank upon supplying fluid pressure to the chamber from an external source.

---

The present invention relates generally as indicated to a vent valve adapted for use as in connection with a fuel tank or the like.

It is a principal object of this invention to provide a vent valve which automatically opens in response to predetermined build up of pressure in a tank on which the valve is mounted and which, additionally, may be opened by fluid pressure from a remote source independent of tank pressure.

Other objects and advantages of the present invention will become apparent as the following description proceeds.

To the accomplishment of the foregoing and related ends, the invention, then, comprises the features hereinafter fully described and particularly pointed out in the claims, the following description and the annexed drawing setting forth in detail a certain illustrative embodiment of the invention, this being indicative, however, of but one of the various ways in which the principle of the invention may be employed.

Figure 1:
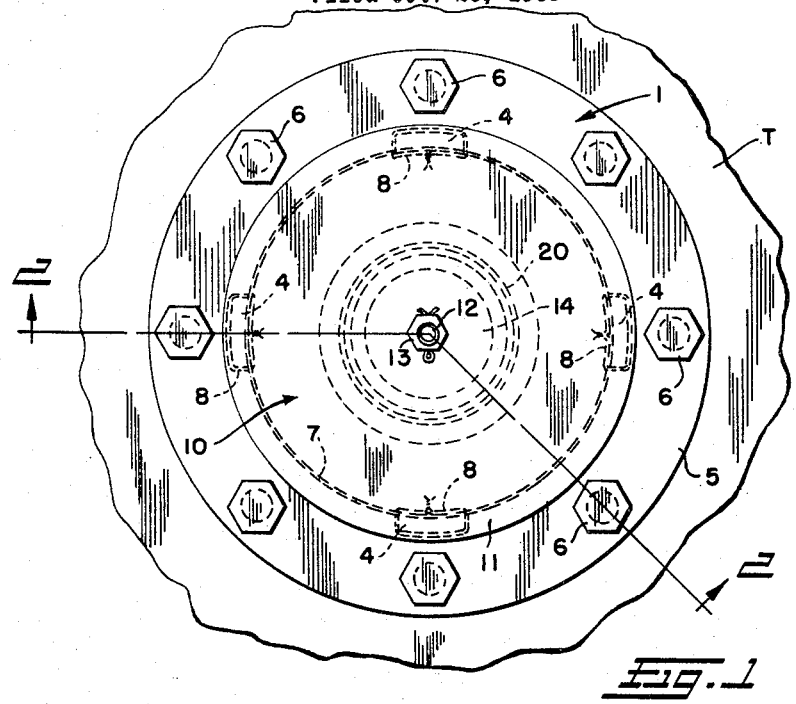
FIG. 1 is a top plan view of a vent valve embodying the present invention.

The vent valve 1 herein shown comprises a tubular body 2 having an intermediate flange portion 3 with upwardly extending legs 4 terminating in a mounting flange 5 by which the valve 1 is secured as by screw means 6 in an opening in the top wall of a fuel tank T or the like.

Within the legs 4 is a tubular screen 7 secured in place as by the lock wires 8 which embrace the respective legs 4 and which extend through the screen openings and have their inner ends twisted together.

The mounting flange 5 carries a packing ring 9 to constitute a seat for the valve member 10, the latter comprising a plate 11 which, when the vent valve is closed, makes sealing contact with the aforesaid packing ring 9. Secured to the plate 11 as by means of the bolt 12 and nut 13 is a piston 14, a stop sleeve 15, a spacer 16, and a spring guide 17. A packing ring 18 seals the joint between the plate 11, piston 14, and bolt 12.

The body 2 has a tubular portion 19 which constitutes a cylinder in which the piston 14 reciprocates when the valve member 10 moves away from and toward the seat.

Around the cylinder 19 and clamped between the plate 11 and the piston 14 is a cover member 20 which prevents foreign matter from gaining access to the exterior surface of the piston 14 and the bore of the cylinder 19. The piston 14 has a sliding seal with the packing ring 21 disposed in the cylinder 19 and, in addition, there is provided a felt or like wiping ring 22 to keep the surface of the piston 14 clean.

Figure 2:
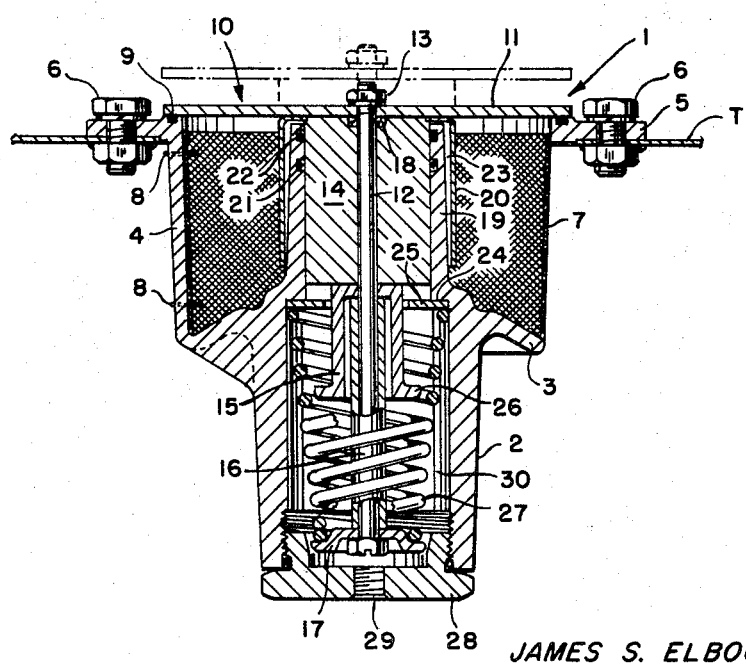
FIG. 2 is a cross-section view taken along line 2—2, FIG. 1.

In the body 2 against the shoulder 24 is a washer 25, the inner portion of which cooperates with the flange 26 of the stop sleeve 15 to limit the amount of opening movement of the valve member 10. Compressed between the washer 25 and the spring guide 17 is a spring 27 which yieldably urges the valve member 10 to closed position as shown in full lines. The dot-dash lines in FIG. 2 show the poppet valve assembly in an open position away from seat 9.

As evident, when the pressure in the tank T acting on the annular area between the packing rings 21 and 9 exceeds the force exerted by the spring 27, the valve member 10 will be urged by such tank pressure to open position to vent the tank T.

The lower end of the body 2 has a plug 28 screwed thereinto which is provided with a port 29 for connection with a remote source of air or hydraulic pressure of magnitude sufficient to overcome spring 27 and to open the valve member 10, and thus when such fluid pressure is admitted into the chamber 30 in the lower end of the body 2, it will act on the area of the piston 14 and will move the valve member 10 to open position regardless of the tank pressure and, of course, when the pressure in the chamber 30 is released, the spring 27 will urge the valve member 10 to closed position.

Thus, in normal tank-filling or draining operations, the attendant will operate a valve (not shown) to admit fluid under pressure in the chamber 30 to open the vent valve 1 whereby the tank T may be readily filled or drained while thus vented. However, even if the vent valve 1 is not thus opened by fluid pressure in chamber 30 during a filling operation, commencement of the tank-filling operation will build up air pressure in the tank T sufficient to open the vent valve 1. It is to be noted that in the specific example herein given the annular area on which the tank pressure acts is about eight times greater than the area of the piston 14, whereby the vent valve 1 can be arranged to be opened by tank pressure of relatively small magnitude. Of course, if the vapor pressure in the tank T builds up due to temperature rise, for example, of the fuel in the tank T, the vent valve 1 will open to relieve such vapor pressure above a desired or predetermined maximum.

Other modes of applying the principle of the invention may be employed, change being made as regards the details described, provided the features stated in any of the following claims, or the equivalent of such, be employed.

I particularly point out and distinctly claim as my invention:

1. A vent valve for a fuel tank and the like comprising a body adapted to be mounted on such tank and having a seat; a valve member movable into and out of engagement with said seat and having a portion adapted to be exposed to fluid pressure in the tank; spring means biasing said valve member into engagement with said seat whereby fluid pressure in the tank of magnitude exceeding the bias of said spring means in acting on said portion of said valve member urges said valve member out of engagement with said seat thus to vent the tank; a piston; a stop sleeve; and means for clamping said piston and stop sleeve to said valve member for movement therewith; said piston being reciprocable in said body and defining with said body a chamber for fluid pressure actuation of said piston to move said valve member out of engagement with said seat independently of the fluid pressure in the tank; and said stop sleeve being adapted to engage a stop means on said body member upon predetermined movement of said valve member away from said seat either by the tank pressure acting on said valve member or the chamber pressure acting on said piston, said valve member having a tubular cover member radially spaced about said piston and attached to said piston at one end for movement therewith, and said body having a tubular extension between said piston and said cover member which provides a chamber for said piston.

2. The vent valve of claim 1 wherein said body has an annular mounting flange at one end by which said body is adapted to be secured around an opening in such fuel tank; and said mounting flange has said seat adjacent its inner periphery; said mounting flange being integrally connected to said body by axially extending legs radially spaced from said body and defining passages therebetween; said valve member being in the form of a plate extending across said one end of said body and movable into and out of engagement with said seat.

3. A vent valve for a fuel tank and the like comprising a body adapted to be mounted on such tank and having a seat; a valve member movable into and out of engagement with said seat and having a portion adapted to be exposed to fluid pressure in the tank; a piston on said valve member reciprocable in said body and defining with said body a chamber for fluid pressure actuation of said piston to move said valve member out of engagement with said seat; spring means biasing said valve member into engagement with said seat whereby fluid pressure in the tank of magnitude exceeding the bias of said spring means and acting on said valve member urges the latter out of engagement with said seat; bolt means extending through said valve member and piston into said chamber; a spring follower engaged by one end of said spring means; a spacer tube, and a stop sleeve clamped by said bolt means to said piston; and a stop washer around said stop sleeve disposed against a shoulder in said body and engaged by the other end of said spring means; said stop sleeve having a collar portion engageable with said stop washer upon predetermined movement of said valve member away from said seat.

4. A vent valve for a fuel tank and the like comprising a tubular body having an annular mounting flange at one end by which said body is adapted to be secured around an opening in such fuel tank; said mounting flange having a seat adjacent its inner periphery and being integrally connected to said body by axially extending legs radially spaced from said body and defining passages therebetween; a plate-like valve member extending across such one end of said body and movable into and out of engagement with said seat; a piston on said valve member reciprocable in such one end of said body and defining with said body a chamber for fluid pressure actuation of said piston to move said valve member out of engagement with said seat; spring means biasing said valve member into engagement with said seat whereby fluid pressure in the tank of magnitude exceeding the bias of said spring means in acting on said valve member urges the latter out of engagment with said seat; bolt means extending through said valve member and piston into said chamber; a spring follower engaged by one end of said spring means, a spacer tube, and a stop sleeve clamped by said bolt means to said piston; a stop washer around said stop sleeve disposed against a shoulder in said body and engaged by the other end of said spring means; said stop sleeve having a collar portion engageable with said washer upon predetermined movement of said valve member away from said seat.

References Cited
UNITED STATES PATENTS

| | | | |
|---|---|---|---|
| 2,696,083 | 12/1954 | Eddy | 251—63.5 XR |
| 2,730,126 | 1/1956 | Jensen | 137—587 |
| 2,748,799 | 6/1956 | Rath | 137—587 |
| 3,115,894 | 12/1963 | Marx | 137—587 XR |
| 3,269,404 | 8/1966 | Lebow | 137—587 XR |

WILLIAM F. O'DEA, *Primary Examiner.*

WILLIAM H. WRIGHT, *Assistant Examiner.*

U.S. Cl. X.R.

127—543.15, 587, 244, 549